2,999,078
ORGANOSILOXANE COATING COMPOSITION OF IMPROVED THERMAL AND CHEMICAL STABILITY

John S. Delphenich, Midland, Mich., assignor to Dow Corning Corporation, Midland, Mich., a corporation of Michigan
No Drawing. Filed June 7, 1957, Ser. No. 664,156
5 Claims. (Cl. 260—22)

This invention relates to a new and useful organosiloxane coating composition.

Due to the practical impossibility of forming a leak proof juncture in welding together pieces of metal for fuel tanks, there has been much research done in developing satisfactory fuel tank sealants. For many purposes organic sealants were satisfactory, but it was well-recognized that the organic compounds failed where heat stability was necessary. For heat stability attention was focused on the silicone field. One fuel tank sealant already in use comprised a gummy composition which was self-sealing due to swelling in fuel. However, this composition also had insufficient heat stability. Therefore, the search arose for a coating composition which would adhere to metal, which required a reasonable curing time and temperature, which was easily handled, had good solvent resistance and temperature stability, and which was sufficiently strong to prevent sealant particles from entering the fuel system.

Similar problems have been encountered in the use of glass cloth-resin ducts to carry hot fuel vapors. Here again the combination of heat and fuel vapor was destructive to organic coatings. Consequently, a composition was sought which would satisfactorily coat glass cloth and which would be stable to both high temperatures and fuel vapors.

The object of this invention is to provide a coating composition which can withstand temperatures up to 460° C. (860° F.) and which has excellent resistance to aliphatic hydrocarbons up to that temperature for long periods of time.

This invention relates to a composition of matter comprising a mixture of (1) a diorganosiloxane containing dimethylsiloxane units or phenylmethylsiloxane units, or both, and containing up to 20 mol percent diphenylsiloxane units and up to 1 mol percent siloxane units of the formula

where each R is selected from the group consisting of monovalent hydrocarbon radicals and halogenated monovalent hydrocarbon radicals and $n$ has an average value of 0 to 3 inclusive, (2) 10 to 100 parts by weight per 100 parts of (1) of a benzene soluble resin copolymer consisting essentially of structural units of $SiO_2$, $R'_3SiO_{1/2}$ and up to .2$R'_2SiO$ units per $SiO_2$ unit, in which resin each R' is a monovalent hydrocarbon radical selected from the group consisting of methyl, ethyl, propyl and phenyl, at least 90 percent of the total number of R' radicals are alkyl and in said copolymer the ratio of R' to Si has an average value of from 1:1 to 1.7:1 inclusive and (3) 80 to 250 parts by weight per 100 parts of (1) of a filler, at least 80 parts of which is selected from the group consisting of metallic zirconate salts, metallic titanate salts, zirconium silicates, titanium silicates, metal fluo-zirconates and metal fluo-titanates.

The diorganosiloxane (1) can range from a fluid having generally a minimum viscosity of 1,000 cs. at 25° C. to a gum having a viscosity over 5,000,000 cs. at 25° C. Furthermore, the siloxane can be a copolymer of the above units or a homopolymer. Since the presence of phenyl radicals in the siloxane improves heat stability and flame resistance, it is preferable that some phenyl siloxane units be present in the diorganosiloxane (1) although they are not necessary.

As stated above, the diorganosiloxane (1) can contain up to 1 mol percent siloxane units of the formula

R can be any monovalent hydrocarbon radical, such as alkyl, e.g. methyl, ethyl, 2-ethyl hexyl and octadecyl; alkenyl, e.g. vinyl, allyl and hexadienyl; cycloalkyl, e.g. cyclohexyl; cycloalkenyl, e.g. cyclopentenyl; aryl, e.g. phenyl, xenyl and naphthyl; alkaryl, e.g. tolyl, and aralkyl, e.g. benzyl. R can also be any halogenated monovalent hydrocarbon radical, such as monofluoromethyl, β-chlorovinyl, 1,1,3-tribromo-3-chlorocyclopentyl, 2-iodo-3,4-cyclohexenyl, pentachlorophenyl, β-bromonaphthyl, α,α,α-trifluorotolyl, o-chloro-p-tolyl, α,α-dibromobenzyl and 2,4,6-trichlorobenzyl. Since $n$ can have an average value from 0 to 3, siloxane units of the formulae $R_3SiO_{1/2}$, $R_2SiO$, $RSiO_{3/2}$ and $SiO_2$ can all be present.

When the diorganosiloxane (1) is a fluid having a viscosity below 15,000 cs. at 25° C., it is preferred that some vinyl siloxane units be present within the limits of the claim. A specially preferred embodiment of such fluids are vinyl endblocked fluids similar to those employed by Keith E. Polmanteer in his copending application, Serial No. 569,974, filed March 7, 1956. However, when the diorganosiloxane (1) is a higher polymer ranging from a fluid having a viscosity of at least 15,000 cs. at 25° C. to a gum, the vinyl siloxane units do not improve the ultimate composition appreciably. With some particularly high polymer gums the presence of vinyl groups may even detract from the heat stability of the final composition.

The diorganosiloxanes (1) of this invention are readily prepared by any of the known methods for preparing siloxanes such as cohydrolysis of the corresponding hydrolyzable silanes and condensation of the resulting silanols or acid or alkali catalyzed polymerization of the corresponding cyclic siloxanes. See, for instance, U.S. Patents 2,489,138 and 2,714,099.

The resin copolymer (2) of this invention can be present in a weight ratio of 10 to 100 parts of (2) per 100 parts of (1). When less than 10 parts of (2) are present in the composition, the resulting product chalks and blisters at high temperature and has poor adhesion and fuel resistance. When more than 100 parts of (2) are present, the resulting product does not have satisfactory heat stability.

Each R' in copolymer (2) can be methyl, ethyl, propyl or phenyl. Thus, $R'_3SiO_{1/2}$ can be such units as trimethylsiloxane, diethylpropylsiloxane, phenyldipropylsiloxane, diphenylmethylsiloxane, triphenylsiloxane and methylethylphenylsiloxane. If less than 90% of the total number of R' radicals are alkyl or if the average R' to Si ratio is outside the range of 1:1 to 1.7:1, the resulting product is unsatisfactory.

The resin copolymer (2) can be prepared by cohydrolyzing the corresponding hydrolyzable silanes, preferably in the presence of a water miscible solvent such as dioxane. In view of the great reactivity of silicon tetrachloride, less gelation occurs when ethyl orthosilicate is employed as one of the reactants as a source of $SiO_2$ units. The preferred method of preparation is that disclosed in U.S. Patent 2,676,182, issued April 20, 1954, which teaches the reaction of an appropriate organosilane or organosiloxane with a silica hydrosol having a pH below 5, there being at least one mole of organosilicon compound per mol of $SiO_2$ in the reaction mixture.

R′$_2$SiO units such as dimethylsiloxane, phenylmethylsiloxane or ethylpropylsiloxane can be present in amount up to .2 unit per SiO$_2$ unit. When such is the case, it is preferred that the diorganosilicon reactant be added to the hydrosol after addition of the triorganosilicon compound has been completed.

The essential class of fillers consists of zirconium and titanium compounds, such as any metal zirconate or titanate, e.g. barium zirconate, barium titanate, sodium zirconate, potassium titanate, iron titanate, calcium zirconate, calcium titanate, lead zirconate, lead titanate, strontium titanate, strontium zirconate, magnesium titanate and magnesium zirconate; any zirconium or titanium silicate, e.g. zirconium silicate, zinc zirconium silicate, barium zirconium silicate, potassium zirconium silicate, calcium zirconium silicate, calcium titanium silicate, vanadium titanium silicate and magnesium zirconium silicate; and any metal fluozirconate or fluotitanate, e.g. sodium fluozirconate, calcium fluozirconate, potassium fluotitanate, lithium fluozirconate and potassium fluozirconate. It is to be understood that any metallic zirconates, metallic titanates, metallic fluozirconates, metallic fluotitanates, zirconium silicates, and titanium silicates, in addition to those specifically mentioned, are within the scope of this invention. The advantages of these zirconium and titanium compounds are not obtained with other zirconium and titanium compounds, such as zirconyl nitrates or alkyl titanates.

A composition of this invention containing at least 80 parts of a zirconium or titanium compound filler of this invention has excellent aliphatic hydrocarbon solvent resistance and excellent heat stability. The preferred utilization of zirconium and titanium compound fillers, however, is in combination with additional fillers. The additional fillers (3) of this invention can be any of those commonly employed singly or in any combination in siloxane elastomers, such as diatomaceous earth, silica aerogels, silica xerogels, fume silica, calcium carbonate, magnesium carbonate, titanium dioxide, zinc oxide, iron oxide, aluminum powder and the like. Silica fillers which have been modified by treatment with silanes, siloxanes, silazanes or other suitable materials can be employed in this invention. When the filler (3) of this invention is present in proportions greater or less than the claimed range, elastomers result which have unsatisfactory properties. Other additives such as pigments, dyes and other stabilizers can also be included. The stabilizing effects of these fillers improves as the particle size decreases. This is particularly true where the material is to be used in the form of a dispersion since there is less settling of the filler in the dispersion. It is often desirable to mill the filled gum on a three-roll mill or mill the final dispersion in a ball mill to improve dispersion.

The compositions of this invention can contain any of the common silicone rubber vulcanizing agents, such as benzoyl peroxide, dicumyl peroxide, 2,4-dichlorobenzoyl peroxide and tertiary butyl perbenzoate. Generally, 1 to 10 parts by weight of vulcanizing agent per 100 parts of polymer produce effective vulcanization and curing. Vulcanizing agents are not required, however, since the compositions of this invention will vulcanize and cure using only atmospheric oxygen.

The manner of compounding the compositions of this invention is well-known to the art utilizing ordinary equipment, such as mixing rolls and dough mixers. The order of addition of resin, fillers, vulcanizing agents, if any, and other additives, if any, to the diorganosiloxane gum is not critical.

The compounded composition can be applied either by dipping, spraying or flooding with a dispersion or by calendering. The dispersions are formed by adding solvents such as toluene, petroleum ether, perchloroethylene and the like to the compositions. When the viscosity of siloxane (1) is low (i.e. below 20,000 cs.), little or no solvent is needed to give an effective dispersion.

Curing can be accomplished by heating the compounded composition at least 2 hours at 260° C. (500° F.) in air or with a peroxide vulcanizing agent. The coating should be preferably from 4 to 10 mils thick. However, up to 24 mils coating thickness will cure to a satisfactory product. When the coating thickness is above 24 mils, some bubbling tends to occur during vulcanization. When the coating thickness is above 30 mils, oxygen curing becomes practically impossible. However, oxygen curing followed by radiation curing produces excellent coatings in deep section. If the cure is entirely by radiation, the resulting coating does not adhere to its base in the presence of hot aliphatic hydrocarbons. Generally, fuel resistance and coating toughness of the compositions of this invention increase with the amount of cure.

Another improvement of this invention is the discovery that the addition of a minor amount of a compatible neutral organic compound to the above compositions substantially reduces the time required for curing and further improves the stability of the cured composition. This organic compound must have a boiling point above 260° C. in order that it does not vaporize during curing. Commercially available organic compounds which are effective include polybutadienes and chlorinated polyphenyls. However, the preferred class of organic compound is a glycol-dibasic carboxylic acid polyester which is end-blocked with a fatty acid. The preferred glycols include ethylene glycol, propylene glycol and diethylene glycol; preferred dibasic acids are those aliphatic carboxylic acids ranging from butanedioic acid to decanedioic acid; and preferred fatty acid endblockers are those saturated acids in the range from caprylic acid to stearic acid.

The neutral organic compound, especially the polyester, when added to the previous compounded composition accelerates vulcanization and curing. The ultimate product is tougher, more elastomeric and has better strength after exposure to hot hydrocarbon fuels. At least 5 parts of the neutral organic compound is required to toughen the ultimate product while keeping it in a rubbery state. However, generally when over 32 parts of the neutral organic compound are used, it is difficult to keep the compound dispersed.

The composition of this invention including the neutral organic compound cures in the presence of oxygen in a minimum of two hours at 260° C. (500° F.). A further cure of one hour at 370° C. (700° F.) improves solvent resistance.

The compositions of this invention are especially useful as fuel tank sealant coatings and coatings for glass cloth where high heat stability and resistance to aliphatic hydrocarbons are required.

The following examples are illustrative of the various facets of this invention and are not intended to limit this invention, which is properly set out in the claims.

*Example 1*

The following composition was mixed by milling: 100.00 parts by weight of (A) a polysiloxane gum (0.050–0.080 plasticity) consisting essentially of 7½ mol percent phenylmethylsiloxane and 92½ mol percent dimethylsiloxane, 66.67 parts by weight of (B) a benzene soluble copolymer consisting essentially of SiO$_2$ units and trimethylsiloxane units and having a methyl-to-silicon ratio of 1.235:1, 180.00 parts by weight of zirconium silicate, 1.7 parts by weight of 2,4-dichlorobenzoyl peroxide (added as a 50 percent by weight solution in dibutylphthalate), 1.00 part by weight ferric octoate (11.5 percent Fe) and sufficient toluene to produce a 46 percent by weight solids dispersion. This composition was poured onto stainless steel panels, air dried for two hours at room temperature and heated from room temperature to 260° C. (500° F.), which temperature was maintained for 16 hours. Separate panels were used in determining the heat stability of the cured composition in air, failure being the cracking and/or peeling of the coating. The results were as follows:

| | Hours |
|---|---|
| 700° F | 18 |
| 750° F | 6 |
| 800° F | 2½ |
| 850° F | Less than 1 |

Coated panels were immersed for 3 hours in an aliphatic hydrocarbon fuel containing less than 5 percent aromatics and which was boiling at 246–8° C. The coatings did not dissolve, crack or peel.

Example 2

100.00 parts by weight of (A), 66.67 parts by weight of (B) and 180.00 parts by weight of zirconium silicate were mixed with 0.25 part by weight of ferric octoate (11.5 percent Fe) and 8.00 parts by weight of (C) an ethylene glycol-sebacate polyester which was endblocked with lauric acid, which had a boiling point above 260° C. and which had a viscosity of 2300 cps. at 25° C. This mixture was diluted with toluene to a 40 percent solids dispersion. The resulting dispersion was poured on stainless steel panels, air dried for two hours at room temperature and heated in air from room temperature to 260° C. (500° F.) which temperature was maintained for 16 hours. The heat stability of these coatings was found to be 7½ hours at 750° F. and more than 3 hours at 800° F. These coatings also resisted effectively the fuel of Example 1 after immersion for 3 hours at 246–8° C.

Example 3

A mixture of 100.00 parts by weight of (A), 50 parts by weight of (B), 180 parts by weight of zirconium silicate, 12 parts by weight of (C) and 1.6 parts by weight of 2,4-dichlorobenzoyl peroxide (added as a 50 percent by weight solution in dibutylphthalate) was dispersed in sufficient toluene to make a 42.25 percent solids dispersion. This dispersion was poured onto stainless steel panels, air dried for 2 hours and heated in air from room temperature to 260° C. (500° F.). The coating was cured in air for 12 hours. The resultant coatings effectively resisted boiling fuel at 246–8° C. for over 3 hours. When these coatings were tested for heat stability in air, the following results were obtained:

| | Hours |
|---|---|
| 750° F | More than 24 |
| 800° F | 6½ |
| 850° F | 3½ |

Test specimens of the composition of this example were, first, immersed in an aliphatic hydrocarbon fuel containing less than 5 percent aromatics for 3 hours at temperatures ranging from 100 to 585° F. (under pressure to prevent boiling), second, exposed for 3 hours to the fuel vapor at from 750° to 860° F. and, third, immersed again for 3 hours in the fuel at from 100° to 585° F. These coatings withstood this test twice in succession.

Other test specimens were exposed to fuel vapor at from 750° to 860° F. for 3 hours and allowed to cool to room temperature. The coatings of this invention withstood two cycles of this test.

Two test specimens have withstood a fuel after immersion for over 4 weeks at room temperature.

Example 4

The experiment of Example 3 was rerun substituting a cure time of 2 hours for the 12 hours used in Example 3. Similar excellent heat stable, fuel resistant coatings were produced.

Example 5

The dispersion of Example 3 was handled as in Example 3 but was cured 24 hours at 500° F. under a nitrogen atmosphere. The resulting products were similar in properties to the products of Example 3.

Example 6

The dispersion of Example 3 was formulated without any 2,4-dichlorobenzoyl peroxide present. The dispersion was utilized as in Example 3. The cure conditions were 12 hours in air at 500° F. The resulting coatings were comparable to those of Example 3.

Example 7

When sodium zirconate, barium titanate, zinc zirconium silicate, calcium titanium silicate, potassium fluotitanate and lithium fluozirconate are substituted for zirconium silicate in Example 3, similar heat stable coatings result which are resistant to aliphatic hydrocarbon fuels.

Example 8

When a polysiloxane gum consisting of .5 mol percent $\alpha,\alpha,\alpha$-trifluorotolylsiloxane, .5 mol percent methylphenylvinylsiloxane, 4 mol percent diphenylsiloxane, 90 mol percent dimethylsiloxane and 5 mol percent phenylmethylsiloxane is substituted for the polysiloxane gum (A) of Example 3, similar coatings result.

Example 9

When phenylmethylpolysiloxane gum (0.050–0.080 plasticity) is substituted for polysiloxane gum (A) in Example 3, similar coatings are produced.

Example 10

When a chlorinated polyphenyl having a viscosity of 450 cs. at 100° F., a refractive index $n_D^{20}$ of 1.640 and a boiling point above 260° C., and polybutadiene having a viscosity of 2500 cs. at 100° F. and a boiling point above 260° C., are each substituted for the polyester (C) of Example 3, similar coatings are produced.

Example 11

100 parts by weight of (A), 50 parts by weight of (B), 12 parts by weight of (C), 1.6 parts by weight of 2,4-dichlorobenzoyl peroxide (added as a 50 percent by weight solution in dibutylphthalate) and 90 parts by weight of zirconium silicate were mixed with the following amounts of each of the following fillers and diluted to 42 percent solids dispersion in toluene:

(I) 90 parts of calcium carbonate
(II) 40 parts of iron oxide

The dispersions were employed and cured according to the method of Example 3. The coatings produced had heat stability and solvent resistance comparable to that of the coatings produced in Example 3.

Example 12

A mixture of 100.00 parts by weight of a polysiloxane fluid (87,000 cs. at 25° C.) consisting essentially of 7½ mol percent phenylmethylsiloxane and 92½ mol percent dimethylsiloxane, 50 parts by weight of (B), 12 parts by weight of (C) and 180 parts of zirconium silicate was dispersed in sufficient toluene to make a 73 percent solids dispersion. This dispersion was poured onto stainless steel panels, air dried for 2 hours and heated in air from room temperature to 260° C. (500° F.). The coating was cured in air for 6 hours. The resultant coatings effectively resisted boiling fuel at 246–8° C. for over 3 hours. The coatings were heat stable to air at 430° C. (806° F.) for over 6 hours.

Example 13

When a resin consisting of 38.9 mol percent $Me_3SiO_{1/2}$ units, 55.6 mol percent $SiO_2$ units and 5.5 mol percent phenylmethylsiloxane units is substituted for copolymer B in Example 3, similar heat stable, fuel resistant coatings are produced.

That which is claimed is:
1. A composition of matter comprising a mixture of (1) a diorganosiloxane in which the siloxane units are selected from the group consisting of dimethylsiloxane units and phenylmethylsiloxane units, which diorganosiloxane can contain up to 20 mol percent diphenylsiloxane units and up to 1 mol percent siloxane units of the formula

where each R is selected from the group consisting of monovalent hydrocarbon radicals and halogenated monovalent hydrocarbon radicals and $n$ has an average value of 0 to 3 inclusive, (2) 10 to 100 parts by weight per 100 parts of (1) of a benzene soluble resin copolymer consisting essentially of structural units of $SiO_2$, $R'_3SiO_{1/2}$ and up to $0.2R'_2SiO$ units per $SiO_2$ unit, in which resin each R' is a monovalent hydrocarbon selected from the group consisting of methyl, ethyl, propyl and phenyl, at least 90 percent of the total number of R' radicals are alkyl and in said copolymer the ratio of R' to Si has an average value of from 1:1 to 1.7:1 inclusive and (3) 80 to 250 parts by weight per 100 parts of (1) of a filler at least 80 parts of which is selected from the group consisting of metallic zirconate salts, metallic titanate salts, zirconium silicates, titanium silicates, metal fluorozirconates and metal fluorotitanates.

2. The composition of claim 1 with (4) a minor amount, based on the amount of (1), of a compatible neutral organic compound having a boiling point above 260° C. said organic compound being selected from the group consisting of polybutadienes, chlorinated polyphenyls and fatty acid endblocked alkylene glycol-dibasic carboxylic acid polyesters.

3. A composition of matter comprising a mixture of (1) a diorganosiloxane in which the siloxane units are selected from the group consisting of dimethylsiloxane units and phenylmethylsiloxane units, which diorganosiloxane can contain up to 20 mol percent diphenylsiloxane units and up to 1 mol percent siloxane units of the formula

where each R is selected from the group consisting of monovalent hydrocarbon radicals and halogenated monovalent hydrocarbon radicals and $n$ has an average value of 0 to 3 inclusive, (2) 10 to 100 parts by weight per 100 parts of (1) of a benzene soluble resin copolymer consisting essentially of structural units of $SiO_2$, $R'_3SiO_{1/2}$ and up to $0.2R'_2SiO$ units per $SiO_2$ unit, in which resin each R' is a monovalent hydrocarbon selected from the group consisting of methyl, ethyl, propyl and phenyl, at least 90 percent of the total number of R' radicals are alkyl and in said copolymer the ratio of R' to Si has an average value of from 1:1 to 1.7:1 inclusive, (3) 80 to 250 parts by weight per 100 parts of (1) of a filler at least 80 parts of which is selected from the group consisting of metallic zirconate salts, metallic titanate salts, zirconium silicates, titanium silicates, metal fluorozirconates and metal fluorotitanates, and (4) 5 to 32 parts by weight per 100 parts of (1) of an alkylene glycoldibasic carboxylic acid polyester which is endblocked with a fatty acid and which has a boiling point above 260° C.

4. A composition of matter comprising a mixture of (1) a methyl phenyl siloxane gum having a viscosity of at least 15,000 cs. at 25° C., (2) 10 to 100 parts by weight per 100 parts of (1) of a benzene soluble resin copolymer consisting essentially of structural units of $SiO_2$, $Me_3SiO_{1/2}$ and up to $0.2Me_2SiO$ units per $SiO_2$ unit, in which resin the ratio of methyl radicals to silicon has an average value of from 1:1 to 1.7:1 inclusive and (3) 80 to 250 parts by weight per 100 parts of (1) of zirconium silicate.

5. The composition of claim 4 with (4) 5 to 32 parts by weight per 100 parts of (1) of an alkylene glycoldibasic carboxylic acid polyester which is endblocked with a fatty acid and which has a boiling point above 260° C.

References Cited in the file of this patent

UNITED STATES PATENTS

| 2,442,196 | Coggeshall | May 25, 1948 |
| 2,607,755 | Bunnell | Aug. 19, 1952 |
| 2,658,882 | Maneri | Nov. 10, 1953 |

FOREIGN PATENTS

| 740,573 | Great Britain | Nov. 16, 1955 |

OTHER REFERENCES

G. E. Publication: "Silicones Fit in Your Future," Waterford, N.Y., Nov. 17, 1952.